United States Patent
Suzuki et al.

[11] 3,905,749
[45] Sept. 16, 1975

[54] APPARATUS FOR PREPARING A SYNTHETIC FLOATING PIPE

[75] Inventors: Todao Suzuki, Toyohashi; Hiroshi Maruyama, Toyakawa, both of Japan

[73] Assignee: Maruhachi Kasei Kogyo Kabushiki Kaisha, Japan

[22] Filed: Oct. 29, 1974

[21] Appl. No.: 518,971

Related U.S. Application Data
[62] Division of Ser. No. 393,190, Aug. 30, 1973.

[30] Foreign Application Priority Data
Aug. 31, 1972  Japan.............................. 27-87673

[52] U.S. Cl. ................. 425/113; 425/290; 425/392
[51] Int. Cl.² ........................................ B29D 23/05
[58] Field of Search ........... 425/290, 113, 114, 392; 264/154–156, 172–174, 209

[56] References Cited
UNITED STATES PATENTS

| | | | |
|---|---|---|---|
| 952,489 | 3/1910 | Wiggins | 425/290 |
| 2,452,607 | 11/1948 | Slaughter | 425/114 |
| 2,484,965 | 10/1949 | Slaughter | 264/173 |
| 2,708,176 | 5/1955 | Rhodes | 264/209 |
| 3,479,422 | 11/1969 | Zavasnik | 264/167 |
| 3,526,692 | 9/1970 | Onaka | 425/113 |
| 3,562,368 | 2/1971 | Bridgeford | 264/209 |

*Primary Examiner*—Al Lawrence Smith
*Assistant Examiner*—Harold P. Smith, Jr.
*Attorney, Agent, or Firm*—Armstrong, Nikaido & Wegner

[57] ABSTRACT

An apparatus for preparing a synthetic pipe for use in a float is disclosed. A first pipe is extruded by the use of a first extruding means and separating plates are inserted and fixed in the pipe in a tight manner at predetermined, intervals in order to form chambers within the pipe. While the pipe is still heated and in a soft state from the extrusion, a perforating means perforates the wall of the first pipe, between the plates thus forming a communication between the atmosphere and the chamber. This eliminates the deformation of the pipe which would be caused if the chamber were sealed from the atmosphere. After the pipe has cooled, a second pipe is extruded around the first pipe in contact therewith in order to cover the first pipe and thus cover the perforations. In this manner, a closed pipe is formed which is suitable for use as a float. The insertion of the separating plates is conducted in such a manner that a ridge is formed at the point of insertion. This is the finished pipe, a plurality of circumferential ridges at predetermined lengths giving an appearance similar to bamboo.

2 Claims, 3 Drawing Figures

APPARATUS FOR PREPARING A SYNTHETIC FLOATING PIPE

This is a division of application Ser. No. 393,190, filed Aug. 30, 1973.

BACKGROUND OF THE INVENTION

This invention relates to an apparatus for preparing a synthetic floating pipe which contains separating plates therein.

By a synthetic floating pipe which contains separating plates therein is meant a pipe which has a structure resembling a bamboo, i.e. a pipe having therein a number of compartments or chambers which are air-tightly separated from each other by plates inserted into the pipe. The compartments or chambers never permit water to penetrate thereinto, and therefore the synthetic floating pipe has the characteristic of considerable buoyancy in water.

The inventor has attempted to prepare the synthetic floating pipe by inserting a number of separating plates into a thermoplastic resin pipe in the process of extrusion. The inventor has filed a utility model application in connection with an apparatus for preparing the article in Japan, which was published under the Japanese utility model publication No. 45-33897. Consequently, the principle of a method for preparing the synthetic floating pipe has already been known. The present invention has been made by adding an improvement to the known principle.

Japanese utility model publication No. 45-33897 discloses an apparatus which comprises mounting on the forward end of an extruder a cross-head die for use in extruding a pipe, providing an inner mold of said die with an aperture extending through the inner mold in the extruding direction, mounting a means for inserting separating plates on said die on the side opposite to the extruding direction, communicating said aperture with an interior cavity of the means, and providing a rod for inserting the plates which reciprocate between the cavity of the means and the aperture. It is possible to continuously prepare a pipe having separating plates therein by means of said apparatus. This is especially true when the separating plates are used, each of which has a perforation extending through the wall thereof. An excellent pipe having separating plates therein can be prepared by means of the apparatus just described in the publication. However, when the separating plate is used which has no perforations, special attention is needed in order to prepare a quality pipe having separating plates therein. This is because deformation occurs in the pipe when the pipe is cooled, owing to formation of a number of chambers or compartments which are air-tightly separated from each other on account of close contact of the separating plates with the pipe. That is, since the pipe is at a high temperature and in a softened state at the time when the separating plates are provided with the pipe, the interior of the compartments or chambers are brought into a state of reduced pressure, and therefore the pipe has a tendency to deform from its original shape. The bigger the diameter of the pipe, the more conspicuous the tendency. Further, the higher an extrusion speed, the more conspicuous the tendency. As a result, said apparatus cannot produce with good efficiency a synthetic floating pipe having the separating plates therein for use in floats.

SUMMARY OF THE INVENTION

The present invention aims to produce the synthetic pipe for use in floats by improving over the drawbacks and avoiding the deficiencies and disadvantages of the past.

The present invention is based upon the principle that minute perforations are provided in a pipe during a process of manufacturing the pipe by extruding synthetic thermoplastic resin, so that the air can penetrate into each of the airtight compartments or chambers which are formed by fixing separating plates to the inner surface of the pipe. Subsequently, the thus obtained pipe is covered over the entire outer surface thereof, with another synthetic thermoplastic pipe extruded from an extruder so as to close the minute perforations.

The present invention provides a process and apparatus for preparing a synthetic pipe containing separating plates therein for use in floats and which comprises inserting a number of thermoplastic resin plates into a thermoplastic resin pipe at certain intervals and fixing the plates tightly to the inner surface of the pipe, while the pipe is being extruded from a die mounted on an extruder, providing the pipe with a plurality of perforations having a minute diameter and extending through the width of the pipe while the pipe is still heated and in a softened state so that each of the compartments or chambers formed in the pipe by the plates may be communicated with the outer atmosphere through the perforations, extruding another thermoplastic resin pipe around said pipe so as to cover said pipe, and contacting both pipes closely so that the perforations are closed by the other pipe.

By way of example, accompanying drawings show a process according to the present invention.

DETAILED DESCRIPTION OF THE DRAWINGS

Figure 1:
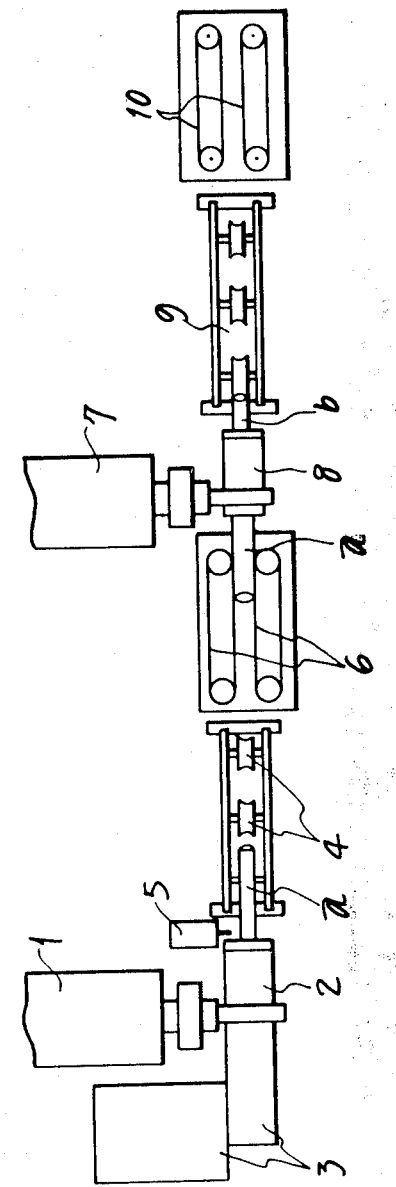
FIG. 1 is a schematical plan view of one embodiment of the process wherein extruders and pipes are partly cut away.

In FIG. 1, cross-head die 2 is mounted on the forward end of extruder 1, and inserting means 3 is mounted on cross-head die 2 in order to transfer the separating plates to pipe $a$ extruded from die 2. After being provided with the separating plates therein, pipe $a$ is perforated by piercing means 5 to have minute pin holes extending through the thickness of the pipe. Pipe $a$ is then cooled in the air and pulled by take-up rolls 6. Thereafter, pipe $a$ is further introduced into cross-head die 8 mounted on extruder 7. Thus, pipe $a$ is covered with another pipe over the entire outer surface of pipe $a$ in cross-head die 8 to form one pipe $b$, as the result the perforations are closed. Pipe $b$ is cooled in cooling box 9, then is pulled by take-up rolls 10.

More particularly, according to the process shown in FIG. 1, a pipe having separating plates therein is formed in the following manner: Molten resin is extruded in the form of a pipe from cross-head die 2 mounted on extruder 1. Separating plates are preformed so as to have such sufficient dimensions that the plates extend across the diameter and are stored in inserting means 3. The separating plates are intermittently transferred into the pipe through cross-head die 2 by means of inserting means 3. Since the pipe extruded from die 2 is in a softened state, the separating plates are allowed to contact closely with inner surface of the pipe, and therefore there are formed in the pipe a number of compartments or chambers which are air-tightly separated by the separating plates. The pipe is advanced onto rolls 4. In the meantime, the pipe is exposed to the air, and is therefore gradually cooled.

Immediately after the compartments or chambers have been formed in the pipe, the pipe is provided with perforations which have minute diameters and extend through wall of the pipe. Thus, there is formed pipe *a*. The perforations are produced by instantaneously piercing the pipe with a needle mounted on the forward end of piercing means 5. Thus, pipe *a* should have at least one perforation in every compartment or chamber. These perforations have a diameter almost equal to the outside diameter of the piercing needle. Pipe *a* is cooled in the air to have such a hardness that it can maintain its shape as a pipe, and then pipe *a* is caught between take-up rolls 6. During the time period while pipe *a* is conveyed to the rolls 6, the air penetrates into every compartment or chamber through every perforation, and therefore the interior of all compartments or chambers in pipe *a* are maintained at the atmospheric pressure. As the result, even in the event wherein the pipe *a* is further cooled, the pipe *a* does not collapse, though the separating plates have been air-tightly fixed in the pipe.

After passing take up rolls 6, pipe *a* is introduced into cross-head die 8 mounted on the second extruder 7. In cross-head die 8, pipe *a* is covered with another pipe of thermoplastic resin extruded from extruder 7. When this additional pipe covers pipe *a* over the entire outer surface thereof, said perforations are closed by the additional pipe, and thus is obtained pipe *b* which has separating plates and no perforations on the outer surface thereof.

Figure 2:
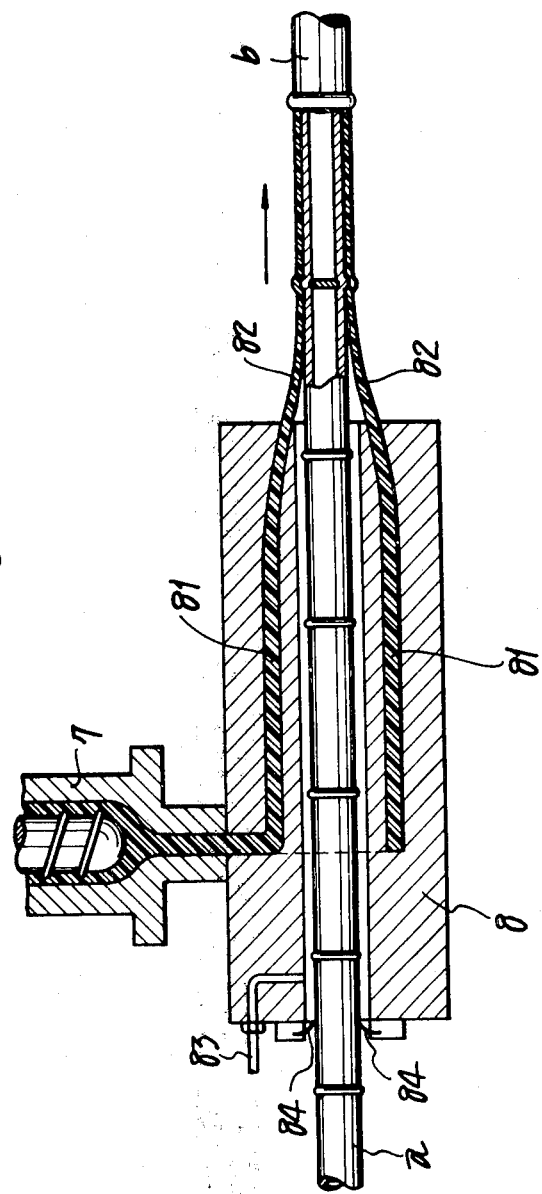
FIG. 2 is a sectional view of a die for extruding another thermoplastic resin pipe around a perforated pipe, wherein perforation is not shown.

In cross-head die 8, it is preferable to discharge the air included between pipe *a* and said additional pipe in order to contact closely both pipes. FIG. 2 shows the mode of a preferable covering process. In FIG. 2, thermoplastic resin is extruded from the second extruder 7 into passage 81, and then is extruded from die 8 in the form of pipe 82. Pipe 82 is the other or additional pipe which is to cover pipe *a*. Tube 83 is connected to a vacuum pump which is not shown, and tube 83 is to discharge the air between pipe *a* and the inner wall surrounding pipe *a* in cross-head die 8. Thus by evacuating the air through tube 83 in die 8, covering pipe 82 is closely contacted with pipe *a* immediately after pipe 82 has been extruded from die 8. As the result, pipe *b* is formed. It should also be noted that packing 84 is provided in order to prevent the air from flowing into die 8 through the opening existing on the inlet side of pipe *a*. Preferably, packing 84 is composed of several sheets of packing materials which are arranged at short distances.

In the process for preparing pipe *b*, pipe *a* is at first prepared such that a number of separating plates are closely fixed to the inner surface of the pipe *a*. However, pipe *a* is then provided with perforations in each of the compartments or chambers confined by the separating plates, so that the air can penetrate into each of the compartments. Consequently pipe *a* does not give rise to any unexpected deformation. Thereafter the covering pipe is formed on pipe *a*, and the resultant pipe *b* does not give rise to any unexpected deformation even when pipe *b* is cooled by contacting with water in cooling box 9 and pulled by take-up rolls 10, because pipe *a* is able to maintain the shape of the combination pipe. Thus, a pipe is obtained which has a number of separating plates air-tightly fixed to the interior of the pipe, and is identified as a synthetic floating pipe containing separating plates therein.

According to the present invention, the separating plates can be firmly fixed to predetermined positions and the resultant pipe does not give rise to any unexpected deformation, though the separating plates are inserted into the pipe which is being extruded from the die mounted on an extruder, and the plates are airtightly fixed to the inner surface of the pipe. Thus, the process enables the production of a synthetic floating pipe containing separating plates therein and which has a desired predetermined shape. Further, two extrusion steps are carried out in this process, and therefore material of the outer pipe may be varied from that of the inner pipe, thus the resultant pipe product may be imparted with a peculiar characteristic by combination of two materials. Moreover, if a resin of the same kind is used in two extrusions, that is, the first extrusion for preparing pipe *a* and the second extrusion for preparing the covering pipe, both pipes can be adhered so intimately that both pipes are never separated. The perforations provided in pipe *a* are so minute in diameter that they can be entirely closed by subsequently overlaying pipe *a* with a covering pipe, and they thus, leave no observable trace or appearance. Furthermore, immediately after the separating plates have been fixed in pipe *a* in the first extrusion, if pipe *a* is pulled at a slightly higher speed, then pipe *a* is allowed to protrude slightly and outwardly in the portions wherein the separating plates have been fixed in pipe *a*, and thus an article is produced which is perforated and has the appearance of bamboo. Also, if pipe *b* is pulled in the second extrusion at a slightly higher speed than that of the first extrusion, then outward protrusions in the vicinity of the separating plates can be maintained in the same state as they were originally. Consequently, an article is obtained which has outward protrusions in places at certain distances, as is similar to bamboo. Such outward protrusions are useful when the pipe is tied by strings because the protrusions act to prevent the strings from slipping off. This invention has such advantages as stated above, as well as others.

Figure 3:
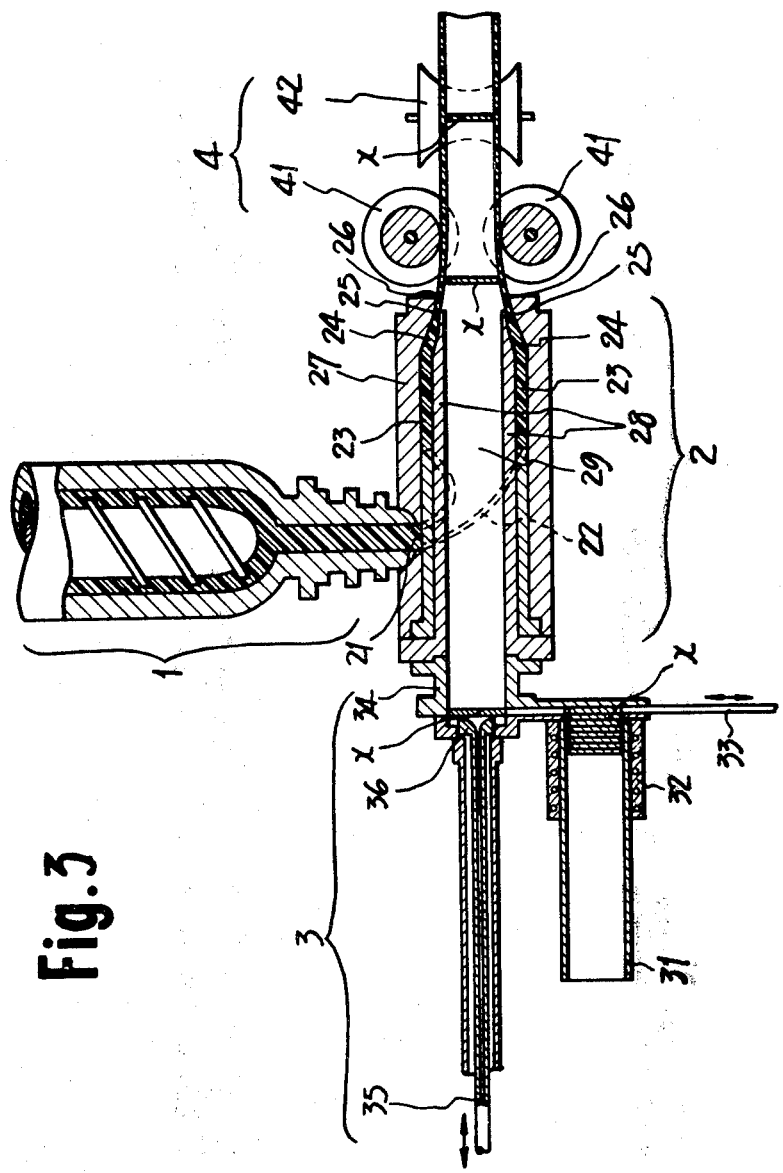
FIG. 3 is a sectional view of a die for extruding a thermoplastic resin pipe and inserting the separating plates in the pipe.

Insertion of the separating plates into the pipe are carried out by means of the following die: in FIG. 3, molten resin is extruded from extruder 1 and introduced into die 2. Die 2 is constructed with outer mold 27 and inner mold 28, between which a tubular passage is formed which starts from 23, through 24 and 25 and ends at 26. Inner mold 28 is provided with aperture 29 which is to pass the separating plates. Molten resin is introduced from portion 21, passed through passage 22, and brought to tubular passage 23. Passage 22 is composed of two portions, each of which goes round by half of circumference of aperture 29 to communicate with passage 23, with gradually increasing the width and gradually changing the advancing direction perpendicularly. Passage 23, 24 and 25 are gradually decreased in thickness in the advancing direction. Forward end of inner mold 28 is located inwardly in relation to forward end of outer mold 27.

Separating plates are inserted into the pipe by the following manner: in FIG. 3, separating plates *x* are at first stored in case 31, and are heated at the sides thereof by heater 32, and are transferred one by one to inserting case 34 by transferring rod 33. One separating plate *x* is fixed to suction disk 36 mounted on inserting rod 35 in inserting compartment 34. Separating plate *x* fixed to suction disk 36 is transferred to die 2 by inserting rod 35. While transferred, the separating plate *x* is further heated at the sides in aperture 29. Thus, separating plate *x* is passed through aperture 29 of inner mold 28 and is inserted into the pipe which is still in contact with inner surface of outer mold 27. At this time, suction from the suction disk is stopped by a means which is not shown in FIG. 3. Thereafter, inserting rod 35 is withdrawn from die 2. Thus, separating plates are provided with the pipe at certain intervals by repeating motions as stated above.

The separating plates can be more firmly fixed to the inner surface of the pipe in the following manner: one method is to pinch and compress the pipe by paired rolls immediately after the pipe has been provided with the separating plates. Further, another method is to use the separating plates having the diameter a little larger than inner diameter of the pipe and to forcibly insert the plate into the pipe, or to heat the sides of the plate prior to the insertion.

It is quite easy to provide the pipe with perforations of minute diameter immediately after the separating plates have been fixed to the pipe which is extruded by the first extrusion. The reason that the pipe can be easily perforated by piercing the pipe with a needle, is because the pipe is in a softened state at this time. A perforating means may be, for example, constructed by providing the forward end of a reciprocating rod with a needle, the needle piercing the pipe when the rod is advanced to the pipe. In order to reciprocate the rod, it is preferable to use electro-magnets or combination of electro-magnets and springs. The perforations will be sufficient, if only one or two perforations having 1–2 mm in diameter are provided for each compartment, for example, having a 4 cm inside diameter and a 20 cm inside length.

The pipe *a* formed by the first extrusion (hereinafter referred to as "the first pipe") is normally made to have a little larger thickness than that of the pipe formed by the second extrusion (hereinafter referred to as "the second pipe"). However, when the first pipe is increased in the thickness, the pipe does not show remarkable protrusions which occur on account of the separating plates. Therefore, in order to make the protrusions more noticeable, it is not advantageous to increase the first pipe too much in thickness. Thus it is preferable that, for example, if the first pipe is made to have 2 mm in thickness, then the second pipe is made to have about 1 mm in thickness. By doing so, a final pipe can be obtained which is about 3 mm in thickness, and has remarkable and beautiful protrusions which give the appearance of bamboo. Therefore, the final pipe obtained by this process is superior to all pipes which are manufactured by conventional methods.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for forming a synthetic pipe with separating plate therein said apparatus comprising
   a. first extruding means for extruding a first pipe;
   b. insertion means for inserting said plates into said pipe at predetermined intervals therein;
   c. perforation means for perforating the wall of said first pipe between said separation plates said perforation means being positioned such that said perforation is made while said first pipe is still heated and soft from the extrusion thereof;
   d. second extrusion means for extruding a second pipe over said first pipe and in contact therewith whereby said perforations are covered and said synthetic pipe is formed thereby.

2. The apparatus of claim 1 wherein said perforation means comprises a pin and means for forcing said pin through the wall of said first pipe and then removing it therefrom.

\* \* \* \* \*